(12) United States Patent
Taira et al.

(10) Patent No.: US 9,268,335 B2
(45) Date of Patent: Feb. 23, 2016

(54) AUTONOMOUS VEHICLE AND ITS FAILURE DETERMINATION METHOD

(71) Applicant: TOYOTA JIDOSHA KABUSHIKI KAISHA, Toyota-shi, Aichi-ken (JP)

(72) Inventors: Tetsuya Taira, Nisshin (JP); Yutaka Takaoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/608,739

(22) Filed: Jan. 29, 2015

(65) Prior Publication Data
US 2015/0234384 A1 Aug. 20, 2015

(30) Foreign Application Priority Data

Feb. 14, 2014 (JP) .................................. 2014-026469

(51) Int. Cl.
*G05D 1/00* (2006.01)
*G05D 1/02* (2006.01)
(Continued)

(52) U.S. Cl.
CPC ............ *G05D 1/0255* (2013.01); *G05D 1/0257* (2013.01); *B60L 15/20* (2013.01); *B62D 6/00* (2013.01); *B62D 61/02* (2013.01); *B62K 1/00* (2013.01); *B62K 3/007* (2013.01); *B62K 11/06* (2013.01); *G06F 17/10* (2013.01); *G06F 19/00* (2013.01); *Y02T 10/7258* (2013.01)

(58) Field of Classification Search
CPC ............... G05D 1/0257; G05D 1/0255; Y02T 10/7258; B62K 11/06; B62K 1/00; B62K 3/007; B60L 15/20; B62D 6/00; B62D 61/02; G06F 17/10; G06F 19/00
See application file for complete search history.

(56) References Cited

U.S. PATENT DOCUMENTS 7,542,834 B2 * 6/2009 Nobori ...................... B60R 1/00
340/435
8,134,480 B2 * 3/2012 Onome ............ G08G 1/096716
340/905
8,583,302 B2 * 11/2013 Akimoto ................. B60L 15/20
180/21

(Continued)

FOREIGN PATENT DOCUMENTS

JP      2006146560 A     6/2006
JP      2013000833 A     1/2013

*Primary Examiner* — Behrang Badii
(74) *Attorney, Agent, or Firm* — Oliff PLC

(57) ABSTRACT

An autonomous vehicle comprises at least one distance measurement means for measuring a distance to a road surface disposed in a vehicle main body, inclination calculation means for calculating an inclination of the vehicle main body based on the distance measured by the distance measurement means, posture calculation means including a sensor that detects at least one of an angular speed and an acceleration of the vehicle main body, the posture calculation means being configured to calculate the inclination of the vehicle main body based on a sensor value detected by the sensor, and failure determination means for determining a failure in each distance measurement means and the posture calculation means by comparing the inclination of the vehicle main body calculated by the inclination calculation means with the inclination of the vehicle main body calculated by the posture calculation means.

6 Claims, 7 Drawing Sheets

(51) Int. Cl.
  *B62K 3/00* (2006.01)
  *G06F 19/00* (2011.01)
  *G06F 17/10* (2006.01)
  *B62K 1/00* (2006.01)
  *B62D 6/00* (2006.01)
  *B60L 15/20* (2006.01)
  *B62D 61/02* (2006.01)
  *B62K 11/06* (2006.01)

(56) References Cited

U.S. PATENT DOCUMENTS

2006/0111814 A1  5/2006  Hachitani et al.
2009/0303077 A1* 12/2009  Onome ............ G08G 1/096716
                                                       340/901
2011/0071715 A1*  3/2011  Akimoto ................. B60L 15/20
                                                        701/22

* cited by examiner

AUTONOMOUS VEHICLE AND ITS FAILURE DETERMINATION METHOD

INCORPORATION BY REFERENCE

This application is based upon and claims the benefit of priority from Japanese patent application No. 2014-026469, filed on Feb. 14, 2014, the disclosure of which is incorporated herein in its entirety by reference.

BACKGROUND OF THE INVENTION

1. Field of the Invention

The present invention relates to an autonomous vehicle that autonomously moves based on a distance measured by distance measurement means, and its failure determination method.

2. Description of Related Art

An autonomous vehicle that includes a posture detection sensor that detects the posture of the vehicle main body and an inclination detection sensor that detects the inclination of the vehicle main body relative to the road surface, and autonomously moves has been known (see Japanese Unexamined Patent Application Publication No. 2006-146560).

The present inventors have found the following problem. In the above-described autonomous vehicle, for example, when one of the posture detection sensor and the inclination detection sensor becomes out of order, it is very difficult to determine the occurrence of the failure in the sensor without using any special inspection apparatus.

The present invention has been made in view of such problem, and a main object thereof is to provide an autonomous vehicle and its failure determination method capable of determining occurrence of a failure of a sensor without using any special inspection apparatus.

SUMMARY OF THE INVENTION

A first exemplary aspect of the present invention is an autonomous vehicle including: at least one distance measurement means for measuring a distance to a road surface, the distance measurement means being disposed in a vehicle main body; inclination calculation means for calculating an inclination of the vehicle main body based on the distance measured by the distance measurement means; posture calculation means including a sensor that detects at least one of an angular speed and an acceleration of the vehicle main body, the posture calculation means being configured to calculate the inclination of the vehicle main body based on a sensor value detected by the sensor; and failure determination means for determining occurrence of a failure in each distance measurement means and the posture calculation means by comparing the inclination of the vehicle main body calculated by the inclination calculation means with the inclination of the vehicle main body calculated by the posture calculation means. With this configuration, it is possible to determine occurrence of a failure in each distance measurement means and the posture calculation means with a simple structure without using any special inspection apparatus.

According to this aspect, the failure determination means may calculate a difference value between the inclination of the vehicle main body calculated by the inclination calculation means and the inclination of the vehicle main body calculated by the posture calculation means, and determine that at least one of the distance measurement means and the posture calculation means is out of order when the calculated difference value is equal to or greater than a threshold. Occurrence of a failure in the distance measurement means and the posture calculation means can be easily determined by comparing the difference value indicating a difference between the inclination of the vehicle main body calculated by the inclination calculation means and that calculated by the posture calculation means with the threshold.

According to this aspect, the autonomous vehicle may further include control means for performing control so as to decelerate and stop the autonomous vehicle when it is determined by the failure determination means that at least one of the distance measurement means and the posture calculation means is out of order. In this way, the autonomous vehicle can be safely stopped even when at least one of the distance measurement means and the posture calculation means becomes out of order, thus leading to an improvement in the safety of autonomous vehicle.

According to this aspect, the distance measurement means may be disposed in a direction oblique to the road surface. In this way, it is possible to detect an obstacle such as a difference in level of the road surface located a certain distance away from the autonomous vehicle, thus making it possible to safely avoid the obstacle, stop the autonomous vehicle, and so on.

Another exemplary aspect of the present invention is a failure determination method for an autonomous vehicle including at least one distance measurement means for measuring a distance to a road surface disposed in a vehicle main body, and posture calculation means including a sensor that detects at least one of an angular speed and an acceleration of the vehicle main body, the posture calculation means being configured to calculate the inclination of the vehicle main body, the failure determination method including: a step of calculating an inclination of the vehicle main body based on the distance measured by the distance measurement means; and a step of determining a failure in each distance measurement means and the posture calculation means by comparing the calculated inclination of the vehicle main body with the inclination of the vehicle main body calculated by the posture calculation means.

According to the present invention, an autonomous vehicle and its failure determination method capable of determining occurrence of a failure of a sensor without using any special inspection apparatus can be provided.

BRIEF DESCRIPTION OF THE DRAWINGS

The above and other aspects, features, and advantages of the present invention will become more apparent from the following description of certain exemplary embodiments when taken in conjunction with the accompanying drawings, in which.

DESCRIPTION OF THE EXEMPLARY EMBODIMENTS

Figure 1:
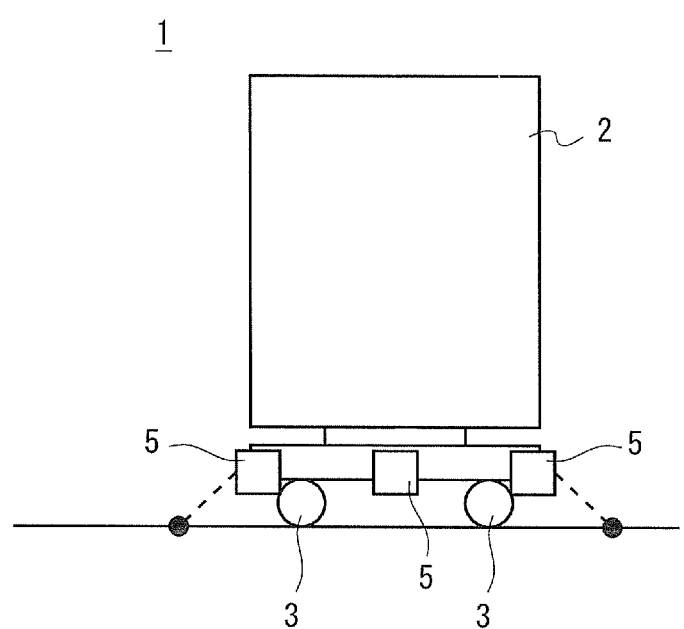
FIG. 1 is a side view showing a general configuration of an autonomous vehicle according to an exemplary embodiment of the present invention.
Figure 2:
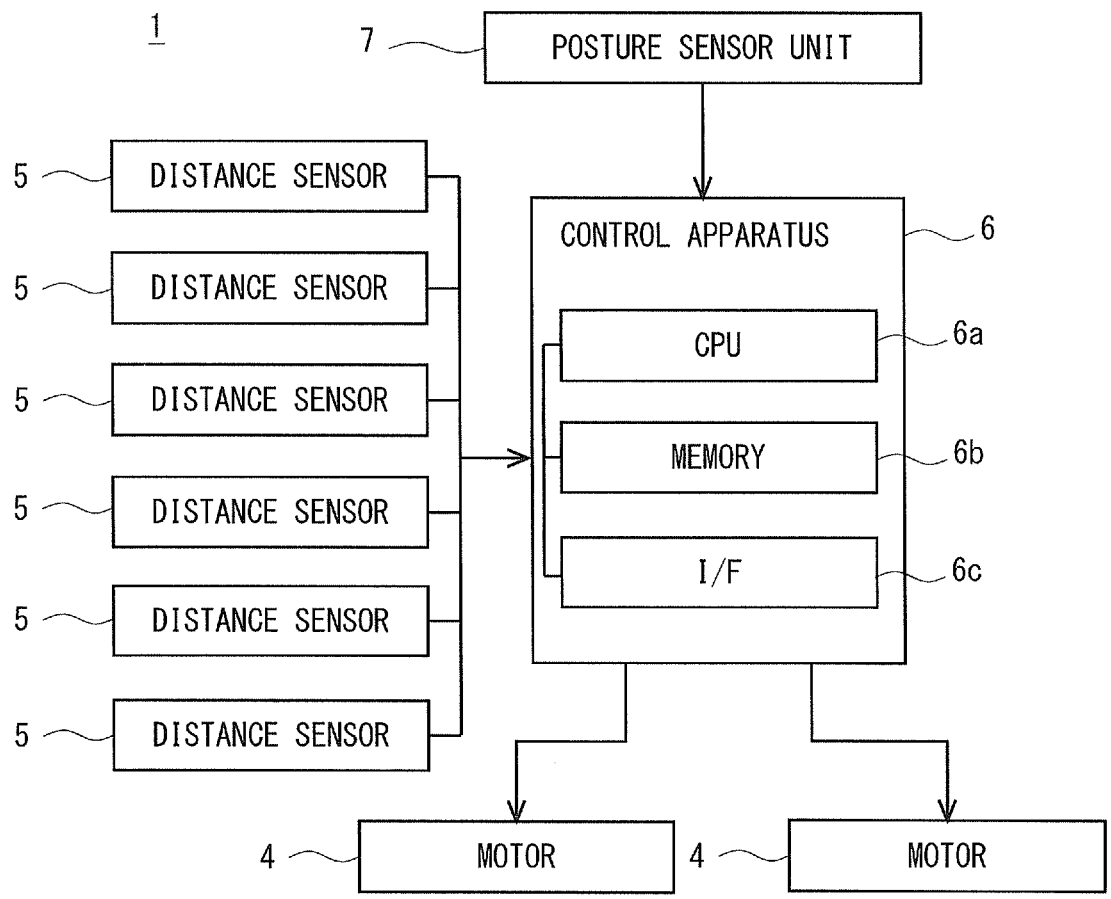
FIG. 2 is a block diagram showing a system configuration of an autonomous vehicle according to an exemplary embodiment of the present invention.

Exemplary embodiments according to the present invention are explained hereinafter with reference to the drawings. FIG. 1 is a side view showing a general configuration of an autonomous vehicle according to an exemplary embodiment of the present invention. FIG. 2 is a block diagram showing a system configuration of an autonomous vehicle according to this exemplary embodiment. An autonomous vehicle 1 according to this exemplary embodiment includes a vehicle main body 2, a plurality of wheels 3 rotatably disposed in the vehicle main body 2, a plurality of motors 4 each of which drives a respective one of the wheels 3, at least one distance sensor 5 that measures a distance, a control apparatus 6 that controls each motor 4 based on a distance measured by the distance sensor 5, and a posture sensor unit 7 that calculates the posture of the vehicle main body 2. Note that the above-described configuration of the autonomous vehicle 1 is merely an example. The present invention is not limited to this configuration and may be applied to arbitrary vehicles that autonomously move.

Figure 3:
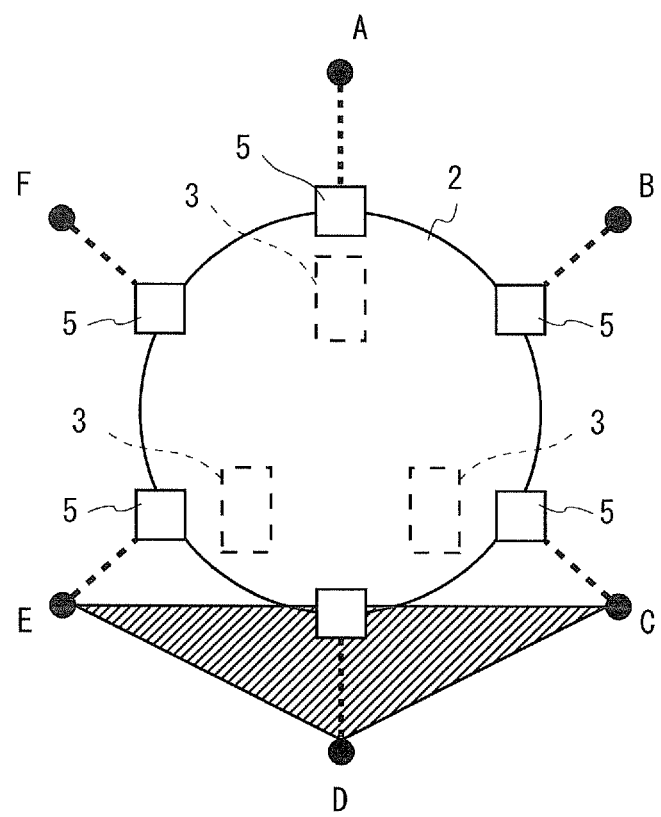
FIG. 3 shows an arrangement of each distance sensor according to an exemplary embodiment of the present invention.
Figure 4:
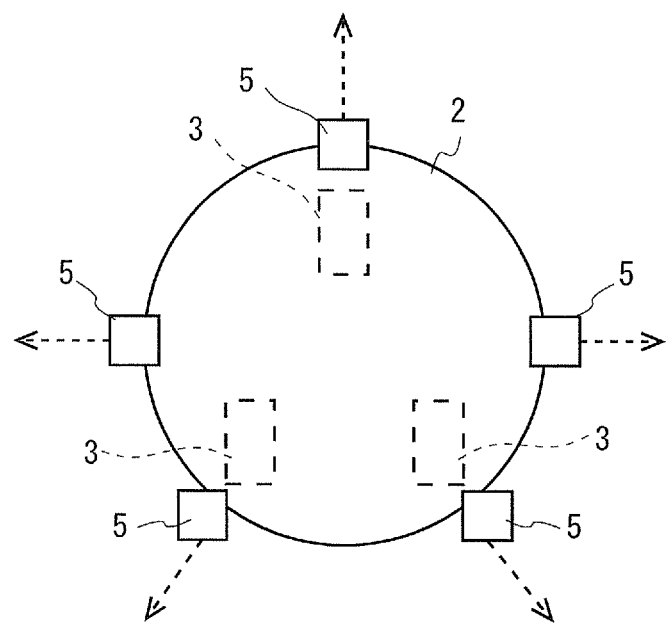
FIG. 4 shows another arrangement of each distance sensor.

Each distance sensor 5 is a specific example of the distance measurement means. Further, each distance sensor 5 is disposed in a direction oblique to the road surface in the traveling direction and measures the distance to the road surface. For example, six distance sensors 5 are provided at regular intervals along the outer peripheral edge of the vehicle main body 2 (FIG. 3). However, the arrangement of the distance sensors 5 is not limited to this arrangement. For example, five distance sensors 5, i.e., one sensor oriented in a forward direction, two sensors oriented in right-left directions, respectively, and two sensors oriented in backward directions may be provided along the outer peripheral edge of the vehicle main body 2 (FIG. 4). The number and positions of the distance sensors 5 may be arbitrarily determined, provided that each distance sensor 5 is directed to the road surface in the traveling direction and able to measure the distance to the road surface. Each distance sensor 5 outputs the measured distance to the control apparatus 6. Examples of the distance sensor 5 include an ultrasonic sensor, a millimeter-wave sensor, an infrared sensor, and a camera.

The control apparatus 6 compares the distances measured by the distance sensors 5 with a predetermined threshold, and thereby controls each motor 4. For example, the control apparatus 6 detects a difference in level (i.e., determines that there is a difference in level) when the distance to the road surface measured by each distance sensor 5 exceeds the threshold. Then, the control apparatus 6 controls each motor 4 based on the detected difference in level so that the autonomous vehicle 1 stops or avoids the difference in level of the road surface.

For example, the control apparatus 6 may be formed by hardware mainly using a microcomputer including a CPU (Central Processing Unit) 6a that performs control processing, arithmetic processing, and so on, a memory 6b including a ROM (Read Only Memory) and/or a RAM (Random Access Memory) that stores a control program, an arithmetic program, and so on to be executed by the CPU 6a, and an interface unit (I/F) 6c that externally receives and outputs signals. The CPU 6a, the memory 6b, and the interface unit 6c are connected with each other through a data bus or the like.

The posture sensor unit 7 is a specific example of the posture calculation means and calculates the inclination angle of the vehicle main body 2 in the pitch direction. The posture sensor unit 7 includes at least one of a gyro-sensor that detects the angular speed of the vehicle main body 2 and an acceleration sensor that detects the acceleration of the vehicle main body 2. The posture sensor unit 7 calculates the inclination angle of the vehicle main body 2 based on a sensor value(s) detected (i.e., obtained) by the gyro-sensor and/or the acceleration sensor, and outputs the calculated inclination angle to the control apparatus 6.

It should be noted that in prior art autonomous vehicles, when one of the distance sensor and the posture detection sensor becomes out of order, it is very difficult to determine occurrence of a failure of the sensor without using any special inspection apparatus.

In contrast to this, the autonomous vehicle 1 according to this exemplary embodiment determines occurrence of a failure in each distance sensor 5 and the posture sensor unit 7 by comparing the inclination angle of the vehicle main body 2 calculated based on the distance measured by each distance sensor 5 with that calculated by the posture sensor unit 7. In this way, it is possible to determine a failure in each distance sensor 5 and the posture sensor unit 7 without using any special inspection apparatus.

In particular, it is important to identify occurrence of a failure in the distance sensors 5 used for detecting an obstacle and in the posture sensor unit 7 used for controlling the posture of the autonomous vehicle 1 and to cope with the failure quickly in order to make the autonomous vehicle 1 travel safely. However, if a special inspection apparatus is mounted to detect occurrence of a failure in the distance sensors 5 and in the posture sensor unit 7, the cost and the size of the autonomous vehicle increase, thus causing a significant disadvantage.

The autonomous vehicle 1 according to this exemplary embodiment can identify a failure in the distance sensors 5 and in the posture sensor unit 7, both of which are particularly important for the autonomous vehicle 1, with a simple configuration just for comparing the inclination angle calculated by the distance sensor 5 with that calculated by the posture sensor unit 7 without using any special inspection apparatus. That is, according to the autonomous vehicle 1 in accordance with this exemplary embodiment, it is possible to improve the safety thereof while preventing or minimizing the increase in the cost thereof.

Figure 5:
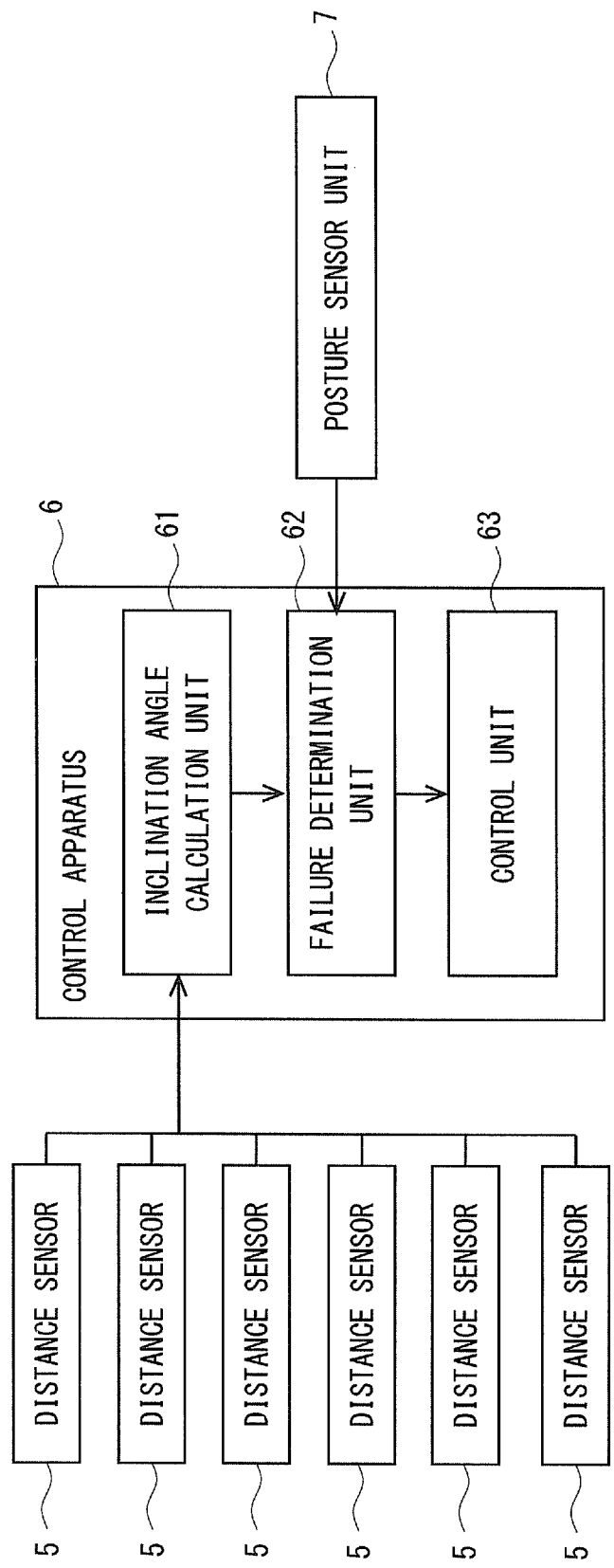
FIG. 5 is a block diagram showing a general system configuration of a control apparatus according to an exemplary embodiment of the present invention.

FIG. 5 is a block diagram showing a general system configuration of a control apparatus according to this exemplary embodiment. The control apparatus 6 according to this exemplary embodiment includes an inclination angle calculation unit 61 that calculates the inclination angle of the vehicle main body 2 in the pitch direction, a failure determination unit 62 that determines occurrence of a failure in each distance sensor 5 and the posture sensor unit 7, and a control unit 63 that controls the traveling performed by the autonomous vehicle 1.

The inclination angle calculation unit 61 is a specific example of the inclination calculation means. For example, the inclination angle calculation unit 61 calculates the inclination angle of the vehicle main body 2 based on distances measured by three arbitrarily selected distance sensors from among the six distance sensors 5. More specifically, the inclination angle calculation unit 61 calculates a plane formula $(ax+by+cz+d=0)$ based on distances measured by three distance sensors 5.

For example, as shown in FIG. 3, the six distance sensors 5 measure distances to distance points A to F, respectively. Here, assume that the inclination angle calculation unit 61 calculates the above-shown plane formula for the distance points C, D and E. The inclination angle calculation unit 61 calculates, for example, the coordinates (Xe, Ye, Ze) of the distance point E based on the below-shown expressions.

$$Xe=(d \cos \phi+R)\cos \theta$$

$$Ye=(d \cos \phi+R)\sin \theta$$

$$Ze=\sin \phi$$

Figure 6A:
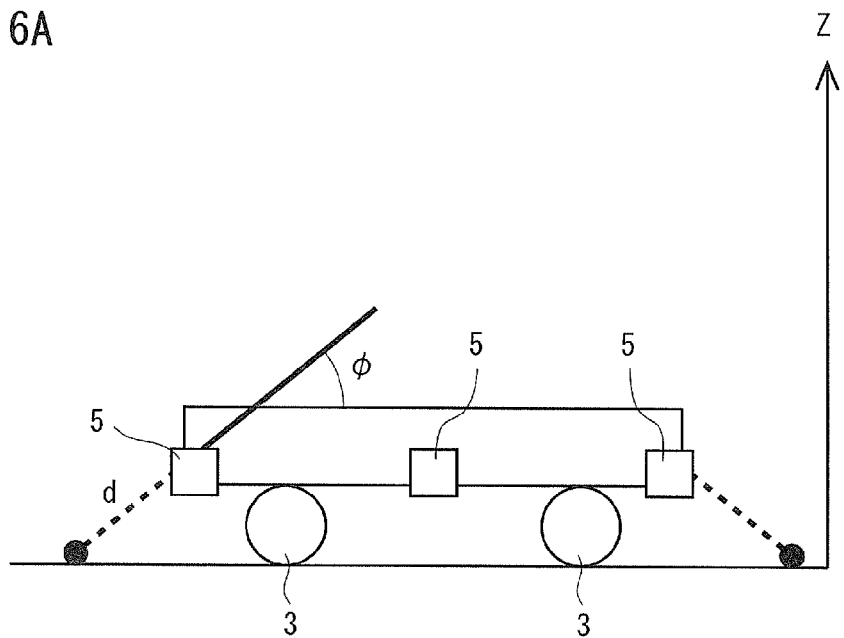
FIGS. 6A and 6B are diagrams for explaining a method for calculating an inclination angle based on distance points.
Figure 6B:
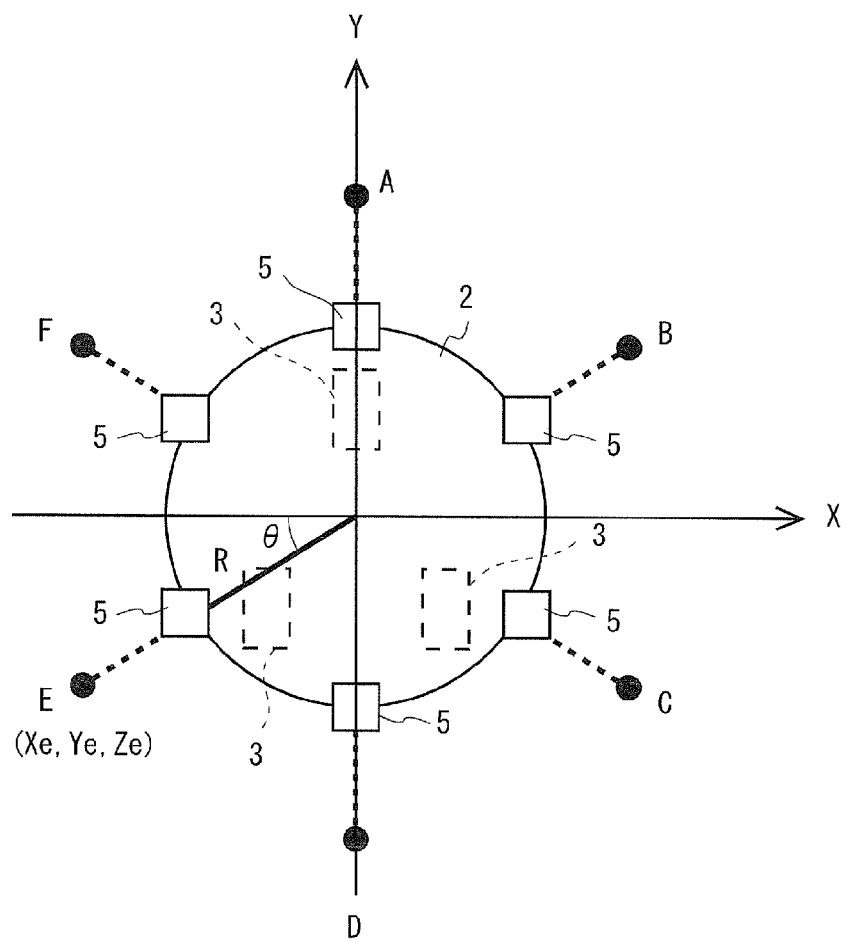

Note that in the above-shown expressions, when the origin is positioned at the center of the vehicle main body 2, R is a distance from the origin to each distance sensor 5 (i.e., the distance sensor corresponding to the distance point E in this example); θ is an angle between a line connecting each sensor 5 (i.e., the distance sensor corresponding to the distance point E in this example) with the origin and the X-axis; d is a distance value measured by each sensor 5 (i.e., the distance sensor corresponding to the distance point E in this example); and φ is an angle of depression (FIGS. 6A and 6B). The distance R and the angle θ are determined according to the position in which each distance sensor 5 (i.e., the distance sensor corresponding to the distance point E in this example) is disposed. The angle of depression φ is determined by the direction in which each distance sensor 5 (i.e., the distance sensor corresponding to the distance point E in this example) is disposed.

The inclination angle calculation unit 61 calculates the coordinates of the distance points C and D in a manner similar to that for calculating the coordinates of the distance point E, and substitutes the calculated coordinates of the distance points C, D and E into the above-shown plane formula (ax+by+cz+d=0). Then, the inclination angle calculation unit 61 calculates the coefficients a to d and thereby calculates a plane including the distance points C, D and E. The inclination angle calculation unit 61 further calculates the normal of the calculated plane. The inclination angle calculation unit 61 calculates the inclination of the calculated normal as the inclination angle of the vehicle main body 2.

Although the inclination angle calculation unit 61 calculates the inclination angle of the vehicle main body 2 by using the distance points C, D and E in the above explanation, the inclination angle calculation unit 61 may calculate the inclination angle of the vehicle main body 2 by using other combinations of three arbitrarily selected distance points from among the six distance points A to F. Further, the above-described calculation method for the inclination angle of the vehicle main body 2 based on the distances obtained by the distance sensors 5 is merely an example. That is, the present invention is not limited to this calculation method and other arbitrary calculation methods can be used.

The inclination angle calculation unit 61 outputs the calculated inclination angle of the vehicle main body 2 to the failure determination unit 62.

The failure determination unit 62 is a specific example of the failure determination means and determines occurrence of a failure in each distance sensor 5 and the posture sensor unit 7 by comparing the inclination angle of the vehicle main body 2 calculated by the inclination angle calculation unit 61 with that calculated by the posture sensor unit 7.

For example, the failure determination unit 62 calculates a difference value between the inclination angle of the vehicle main body 2 output from the inclination angle calculation unit 61 and that output from the posture sensor unit 7. Then, the failure determination unit 62 determines that at least one of the distance sensors 5 and the posture sensor unit 7 is out of order when the calculated difference value is equal to or greater than a threshold.

Under normal conditions, the inclination angle of the vehicle main body 2 calculated based on the distance measured by each distance sensor 5 is substantially equal to that calculated by the posture sensor unit 7. However, when at least one of the distance sensors 5 and the posture sensor unit 7 becomes out of order, the sensor value of the failed sensor deviates widely. Therefore, it is possible to easily determine occurrence of a failure in each distance sensor 5 and the posture sensor unit 7 by comparing the inclination angle of the vehicle main body 2 calculated by the inclination angle calculation unit 61 with that calculated by the posture sensor unit 7.

When the failure determination unit 62 determines that at least one of the distance sensors 5 and the posture sensor unit 7 is out of order, the failure determination unit 62 outputs a failure signal indicating the failure determination result to the control unit 63.

The control unit 63 is a specific example of the control means and controls the driving of each motor 4 according to the failure signal output from the failure determination unit 62. Upon receiving the failure signal from the failure determination unit 62, the control unit 63 controls the driving of each motor 4 so that, for example, the autonomous vehicle 1 is decelerated and stopped. In this way, the autonomous vehicle 1 can be safely stopped even when at least one of the distance sensors 5 and the posture sensor unit 7 becomes out of order, thus leading to an improvement in the safety of the autonomous vehicle.

Note that the control unit 63 may alert the user by using a warning device when the control unit 63 receives a failure signal from the failure determination unit 62. Examples of the warning device include a sound output device that outputs an audible alarm, a lighting device that turns on, or turns on and off, a warning lamp, a display device that displays warning information, and a communication device that notifies a third party in a remote place.

Figure 7:
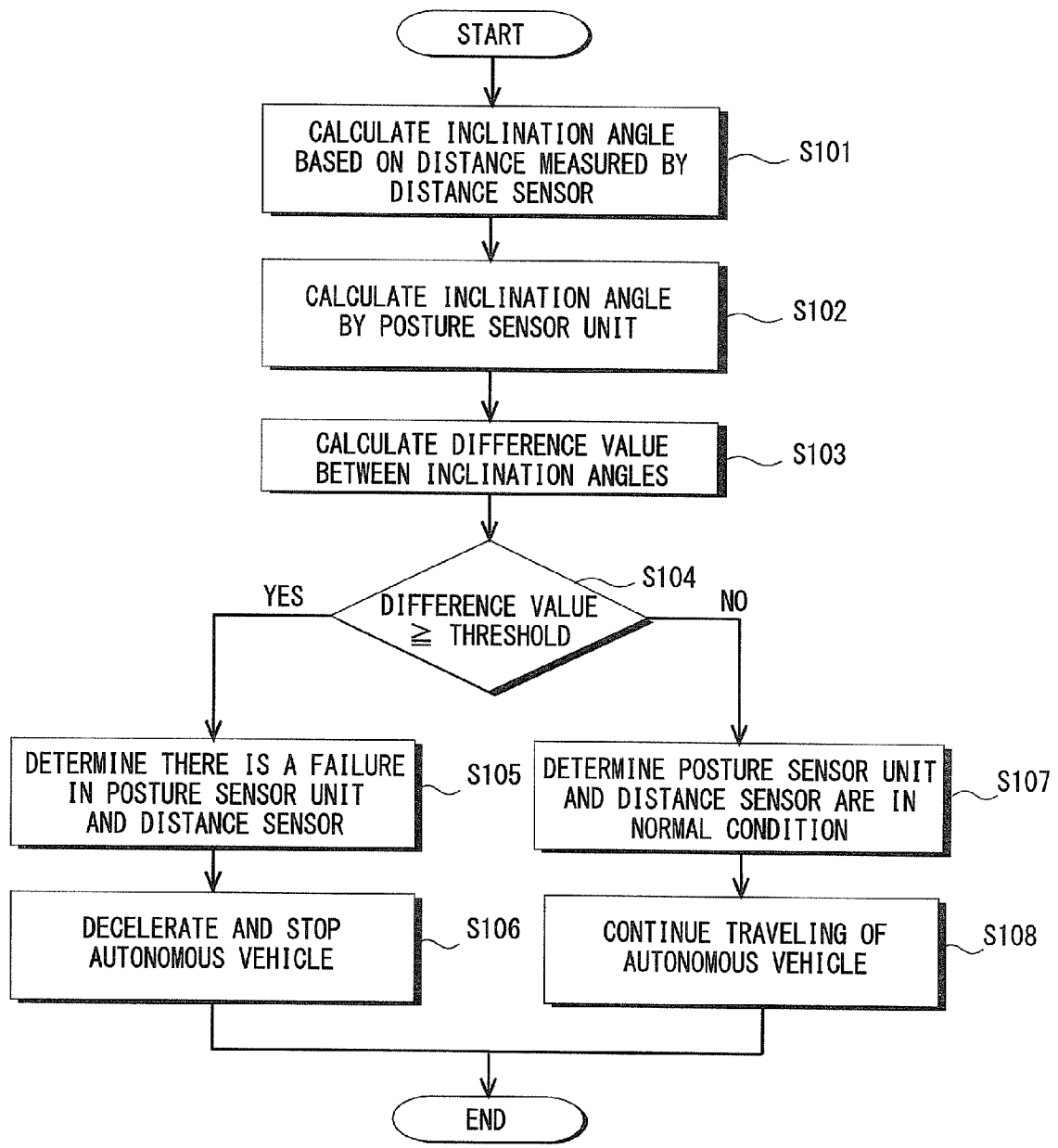
FIG. 7 is a flowchart showing a process flow of a failure determination method for an autonomous vehicle according to an exemplary embodiment of the present invention.

FIG. 7 is a flowchart showing a process flow of a failure determination method for an autonomous vehicle according to this exemplary embodiment.

The inclination angle calculation unit 61 calculates the inclination angle of the vehicle main body 2 based on the distance measured by each distance sensor 5, and outputs the calculated inclination angle to the failure determination unit 62 (step S101). The posture sensor unit 7 calculates the inclination angle of the vehicle main body 2 based on a sensor value(s) detected by a gyro-sensor and/or an acceleration sensor, and outputs the calculated inclination angle to the failure determination unit 62 (step S102).

The failure determination unit 62 calculates a difference value between the inclination angle of the vehicle main body 2 output from the inclination angle calculation unit 61 and that output from the posture sensor unit 7 (step S103). Then, the failure determination unit 62 determines whether or not the calculated difference value is equal to or greater than a threshold (step S104).

When the failure determination unit 62 determines the calculated difference value is equal to or greater than the threshold (Yes at step S104), the failure determination unit 62 determines that at least one of the distance sensors 5 and the posture sensor unit 7 is out of order (step S105). The failure determination unit 62 then outputs a failure signal to the control unit 63. The control unit 63 controls the driving of each motor 4 so that the autonomous vehicle 1 is decelerated and stopped (step S106).

On the other hand, when the failure determination unit 62 determines the calculated difference value is smaller than the threshold (No at step S104), the failure determination unit 62 determines that each distance sensor 5 and the posture sensor unit 7 are in the normal condition (step S107). In this case, the failure determination unit 62 does not output the failure signal to the control unit 63. Therefore, the control unit 63 controls the driving of each motor 4 so that the autonomous vehicle 1 continues the traveling (step S108).

Note that the above-described processes shown in FIG. 7 are repeated at predetermined minute intervals. However, the present invention is not limited to this procedure. That is, the above-described processes may be temporarily suspended depending on the load state of the CPU 6a and/or the moving and stopping state of the autonomous vehicle 1. For example, the control apparatus 6 suspends the above-described failure determination process when the processing load of the CPU 6a is equal to or greater than a threshold or when it is determined that the autonomous vehicle 1 is in the stopping state. In this way, the processing load of the control apparatus 6 can be reduced.

As explained above, the autonomous vehicle 1 according to this exemplary embodiment determines a failure in each distance sensor 5 and the posture sensor unit 7 by comparing the inclination angle of the vehicle main body 2 calculated based on the distance measured by each distance sensor 5 with that calculated by the posture sensor unit 7. In this way, it is possible to determine occurrence of a failure in each distance sensor 5 and the posture sensor unit 7 without using any special inspection apparatus.

Note that the present invention is not limited to the above-described exemplary embodiments, and various modifications can be made without departing from the spirit and scope of the present invention.

For example, in the above-described exemplary embodiment, the failure determination unit 62 of the control apparatus 6 may determine occurrence of a failure in each distance sensor 5 and the posture sensor unit 7 by comparing the angular speed of the inclining action of the vehicle main body 2 calculated based on the distance measured by each distance sensor 5 with that calculated by the posture sensor unit 7. The failure determination unit 62 calculates a difference value between the angular speed of the inclining action of the vehicle main body 2 output from the inclination angle calculation unit 61 and that output from the posture sensor unit 7. Then, the failure determination unit 62 determines that at least one of the distance sensors 5 and the posture sensor unit 7 is out of order when the calculated difference value is equal to or greater than a threshold.

Alternatively, the failure determination unit 62 may determine a failure in each distance sensor 5 and the posture sensor unit 7 by comparing the angular acceleration of the inclining action of the vehicle main body 2 calculated based on the distance measured by each distance sensor 5 with that calculated by the posture sensor unit 7.

In the present invention, the processes shown in FIG. 7 can be implemented by causing the CPU 6a to execute a computer program.

The above-described program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)).

Further, the program can be supplied to computers by using various types of transitory computer readable media. Examples of the transitory computer readable media include an electrical signal, an optical signal, and an electromagnetic wave. The transitory computer readable media can be used to supply programs to computers through a wire communication path such as an electrical wire and an optical fiber, or wireless communication path.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An autonomous vehicle comprising:
at least one distance measurement means for measuring a distance to a road surface, the distance measurement means being disposed in a vehicle main body;
inclination calculation means for calculating an inclination of the vehicle main body based on the distance measured by the distance measurement means;
posture calculation means including a sensor that detects at least one of an angular speed and an acceleration of the vehicle main body, the posture calculation means being configured to calculate the inclination of the vehicle main body based on a sensor value detected by the sensor; and
failure determination means for determining occurrence of a failure in each distance measurement means and the posture calculation means by comparing the inclination of the vehicle main body calculated by the inclination calculation means with the inclination of the vehicle main body calculated by the posture calculation means.

2. The autonomous vehicle according to claim 1, wherein the failure determination means calculates a difference value between the inclination of the vehicle main body calculated by the inclination calculation means and the inclination of the vehicle main body calculated by the posture calculation means, and determines that at least one of the distance measurement means and the posture calculation means is out of order when the calculated difference value is equal to or greater than a threshold.

3. The autonomous vehicle according to claim 1, further comprising control means for performing control so as to decelerate and stop the autonomous vehicle when it is determined by the failure determination means that at least one of the distance measurement means and the posture calculation means is out of order.

4. The autonomous vehicle according to claim 1, wherein the distance measurement means is disposed in a direction oblique to the road surface.

5. An autonomous vehicle comprising:
at least one distance sensor that measures a distance to a road surface disposed in a vehicle main body;
an inclination calculation unit that calculates an inclination of the vehicle main body based on the distance measured by the distance sensor;
a posture sensor unit including a sensor that detects at least one of an angular speed and an acceleration of the vehicle main body, the posture sensor unit being configured to calculate the inclination of the vehicle main body based on a sensor value detected by the sensor; and
a failure determination unit that determines a failure in each distance sensor and the posture sensor unit by comparing the inclination of the vehicle main body calculated by the inclination calculation unit with the inclination of the vehicle main body calculated by the posture sensor unit.

6. A failure determination method for an autonomous vehicle comprising at least one distance measurement means for measuring a distance to a road surface disposed in a vehicle main body, and posture calculation means including a sensor that detects at least one of an angular speed and an acceleration of the vehicle main body, the posture calculation means being configured to calculate the inclination of the vehicle main body, the failure determination method comprising:
 calculating an inclination of the vehicle main body based on the distance measured by the distance measurement means; and
 determining occurrence of a failure in each distance measurement means and the posture calculation means by comparing the calculated inclination of the vehicle main body with the inclination of the vehicle main body calculated by the posture calculation means.

* * * * *